United States Patent [19]

Trungold

[11] 4,303,001
[45] Dec. 1, 1981

[54] BOLT TENSION INDICATING MEANS

[76] Inventor: Emanuel H. Trungold, 14-B Broun Place, Bronx, N.Y. 10475

[21] Appl. No.: 55,988

[22] Filed: Jul. 9, 1979

Related U.S. Application Data

[63] Continuation-in-part of Ser. No. 825,558, Aug. 18, 1977, Pat. No. 4,164,164, which is a continuation-in-part of Ser. No. 704,768, Jul. 13, 1976, abandoned.

[51] Int. Cl.$^3$ .............................................. F16B 31/02
[52] U.S. Cl. ...................................... 411/10; 411/531
[58] Field of Search .......................... 85/50 R, 61, 62; 73/88 F; 151/34, 38, 46

[56] References Cited

U.S. PATENT DOCUMENTS

| | | | |
|---|---|---|---|
| 2,824,481 | 2/1958 | Johnson | 85/62 |
| 3,060,731 | 10/1962 | Adise | 85/62 |
| 3,104,645 | 9/1963 | Harrison | 85/62 |
| 3,153,974 | 10/1964 | Canning | 85/62 |
| 3,174,386 | 3/1965 | Lewis | 85/62 |
| 3,224,316 | 12/1965 | Grikscheit et al. | 73/761 X |
| 3,285,120 | 11/1966 | Kartiala | 85/62 |
| 3,383,974 | 5/1968 | Dahl | 85/62 |
| 3,495,907 | 2/1970 | Rogers | 85/50 R |
| 3,783,734 | 1/1974 | Velthoven | 85/62 |
| 3,788,186 | 1/1974 | Crites | 85/62 |

FOREIGN PATENT DOCUMENTS 1553578  12/1968  France ................................. 85/62

*Primary Examiner*—J. Franklin Foss
*Attorney, Agent, or Firm*—Hubbell, Cohen, Stiefel & Gross

[57] ABSTRACT

Improved flat annular washer for indicating tension on associated high tensile strength bolt. Washer bears against either bolt head or nut of given radius. Washer includes means for indicating stress on washer which visibly moves when stress on washer, which is related to tensile stress on bolt, reaches a preselected level.

7 Claims, 9 Drawing Figures

U.S. Patent
Dec. 1, 1981
4,303,001
FIG. 1.
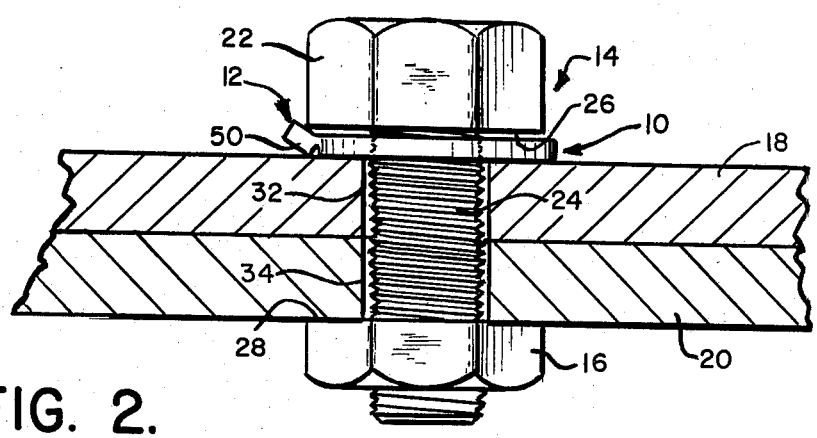
FIG. 2.
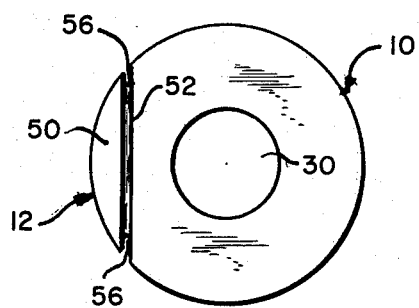
FIG. 3.    FIG. 4.
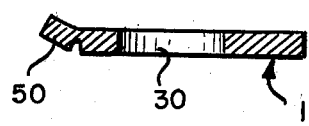 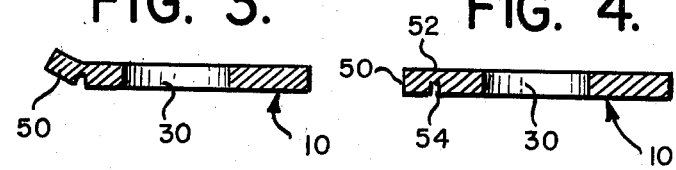
FIG. 5.
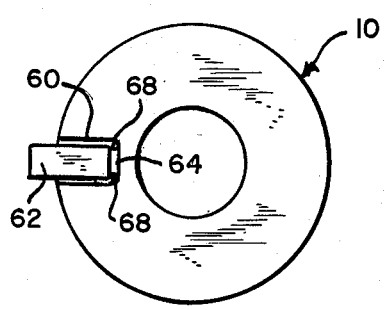
FIG. 6.    FIG. 7.
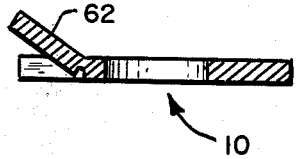 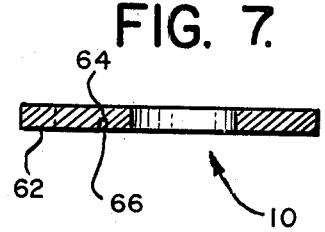
FIG. 8.
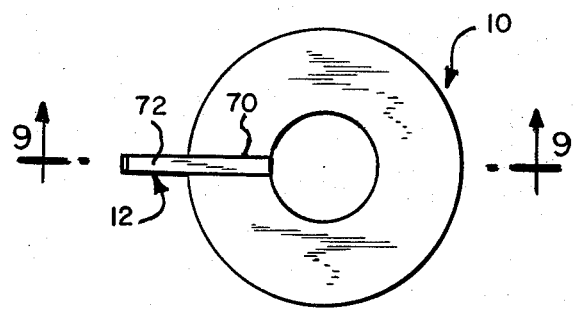
FIG. 9.
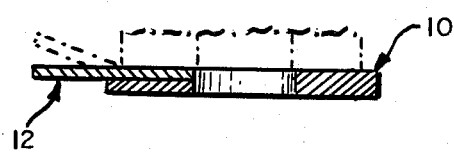

BOLT TENSION INDICATING MEANS

CROSS-REFERENCES TO RELATED APPLICATONS

This application is a continuation-in-part of application Ser. No. 825,558, filed on Aug. 18, 1977, now U.S. Pat. No. 4,164,164 the contents of which are incorporated by reference herein in their entirety. Application Ser. No. 825,558 is, in turn, a continuation-in-part of application Ser. No. 704,768, filed July 13, 1976 now abandoned, the contents of which are also incorporated by reference herein in their entirety.

BACKGROUND OF THE INVENTION

1. Field of the Invention

This invention relates to washers for high tensile strength nuts and bolts and particularly to washers having means for indicating when a predetermined tension has been realized on the bolt.

2. The Prior Art

The amount of tension in a high tensile strength bolt is a critical parameter in steel fabrication. If the bolt is not tight enough, then the joint of which the bolt is part will not be as strong as designed. On the other hand, if the bolt is overstressed, a potential future failure is built into the joint.

Among the most common techniques for determining the tension in a bolt is by the use of a wrench capable of delivering a certain torque, which torque is equated to a predetermined tension on the bolt. This common technique is recognized by everyone skilled in the art to be one that is highly variable in result due to significant variations in friction which could lead to requirements for high or low torque to twist a bolt at any predetermined actual tension. Thus, the correlation is rough and the indication can prove highly inaccurate. Such a method is described and its disadvantages are discussed in an article which appeared in the Mar. 6, 1975 issued of *Machine Design* at pages 78 to 82.

The deficiencies in a method of determining tension by measuring torque have been recognized for a very long time and there have been numerous attempts to provide ways of yielding a more direct technique for accomplishing this desirable end. Thus, in Seitz U.S. Pat. No. 2,394,812 granted on Feb. 12, 1946, it is proposed to provide such an indicating means by employing two nuts which are soldered together and then applying a wrench to one of the nuts, specifically the outer one, and tightening the two until the torque on the nut actually engaged by the wrench becomes so great relative to the other nut that the solder is sheared. When the outer nut is thus severed from the inner, an indication of the bolt tension is given. The Seitz method has several aspects that have limited commercial realization. First, it requires two nuts which add to the cost. Secondly, the Seitz lock nut still relies on torque as an indication of bolt tension since it is the shear force resuling from torquing that will cause the shearing of the solder between the two nuts. This being so, the Seitz method is still an indirect method with all of the resultng shortcomings of the standard torque method.

In Lewis U.S. Pat. No. 3,174,386, a special washer is disclosed which yields a direct indication of bolt tension. This is accomplished by providing the washer with two flared out portions and a necked down center, which necked down center will actually collapse when the tension in the bolt reaches a predetermined level. While Lewis thus gives a direct indication of bolt tension, rather than an indirect indication determined from torque, the Lewis washer tends to be costly to manufacture and the indicating portion is recessed between the bolt head and the adjacent plate and is not readily visible to the person applying bolt tension. Moreover, it requires soft steel which is contrary to acceptable modern practice of forming washers for high strength bolts from heat treated hardened steel.

It has been proposed to incorporate in bolt heads or in washers a variety of materials which change their optical properties, such as color or plane of polarization, when subjected to certain minimum amounts of tension. For example, reference may be had to the Grikscheit et al U.S. Pat. Nos. 3,224,316 and 3,495,907. However, to the best of applicant's knowledge, such optical indicating means have not achieved any degree of commercial success, partly due to the inclusion of soft optical materials therein.

In Velthoven U.S. Pat. No. 3,783,734, it is proposed to use a specially designed washer in conjuction with a specially designed nut or bolt head which cooperates to cause a frangible piece of the specially designed washer to break off when a predetermined tension is achieved in the bolt. The specially designed nut or bolt head, however, requires a reduction in the bearing surface provided by said nut or bolt head, thereby reducing the effective tension capable of being handled by said nut or bolt.

In Crites U.S. Pat. No. 3,788,186, a stress indicating means is described which provides for the incorporation of a frangible insert in the head of a bolt or on a washer, which frangible insert will break when a tension of certain proportions is achieved in the bolt. In the usual tightening of such a bolt by a socket wrench, the socket covers and therefore conceals the indication element during the course of tightening. Also, the Belleville type washer is not allowed by most Codes for use with high tensile bolts. There are a number of commercially available washers presently on the market which do yield direct indications of bolt tension. Thus, for example, there is a four-piece washer assembly termed "preload indicating washer" that is manufactured by The Standard Pressed Steel Company which is described in a publication entitled *Fasteners Handbook* at page 278. This same washer assembly is described in the aforementioned article in *Machine Design* at page 81. In addition, Illinois Tool Works, Inc. markets a so-called "square cone washer" which is apparently described in U.S. Pat. No. 3,628,584. Additionally, Cooper & Turner, Inc. and Bethlehem Steel Company both market a load indicator washer each of which is apparently described in U.S. Pat. No. 3,187,621 which is owned by Cooper & Turner, Inc. However, all three of these commercially available washers yield an indication that is not readily visible and often requires a guage or the like in order to determine precisely what is being indicated by them. The "square cone washer" is essentially a Belleville type washer with the same objections cited for Crites. The Bethlehem washer does not provide full bearing between the undersurface of the nut or bolt and the top of the washer. In high heat applications this could lead to a relaxation of bolt tension.

SUMMARY OF THE INVENTION

According to the invention, I have developed an improved flat annular washer including means for visually indicating that the stress transmitted to the washer by the bolt has reached a preselected level. In a preferred embodiment of the invention, the visual indicating means comprises a tab joined to the balance of the washer by a portion of reduced cross section with at least a portion of the tab extending a distance from the center of the washer not less than the radius of the bolt head. The portion of reduced cross section is designed with a predeteremined stress failure which is reached when the stress transmitted to the washer by the bolt reaches a preselected level. Thus, when the washer is stressed to the preselected level, the portion of reduced cross section fails whereupon the tab moves relative to the balance of the washer. This movement provides a visual indication that the preselected stress level has been reached.

In one embodiment, the tab and portion of reduced cross section are defined by a slot in one surface of the washer along a chord thereof. However, this is not necessary, and other arrangements are possible. For example, in the presently preferred embodiment the tab is disposed in a peripheral recess in the washer and integrally joined thereto at the radially inward end of the recess by the portion of reduced cross section.

In a variation of the preferred embodiment, the portion of reduced cross section is rendered brittle as by case hardening or carburizing. As a result, when the stress on the washer reaches a given level, the portion of reduced cross section fractures whereupon the tab separates from the balance of the washer. By controlling the process utilized to render the portion of reduced cross section brittle, the stress at which said portion fractures may be predetermined.

It has been found that in all these embodiments, it is preferable to start with the tab at an angle with respect to the remainder of the washer and have the bolt head overlie the portion of reduced cross section, as this produces the most pronounced movement of the tab when the preselected stress level has been achieved. Also, it is preferable that the surface of the washer having the slot which defines the portion of reduced cross section faced away from the bolt head. In those embodiments where the portion of reduced cross section does not fracture, the tab will then move to a position substantially coplanar with the remainder of the washer when the preselected stress level has been achieved.

In another embodiment of the invention, the washer is provided with a groove extending radially inward from its periphery, and the visual indicating means comprises a resilient element having a predetermined bias equal to the preselected stress level.

Most preferably, the resilient element comprises a metal leaf spring. A portion of the resilient element is complementary in shape to the groove, whereby when said portion is disposed in the groove, one surface thereof is coplanar with the grooved surface of the washer. Preferably, the portion of the spring disposed in the groove is not fixedly secured therein whereby different leaf springs having different predetermined biases may be used with a single washer. However, if desired, the leaf spring may be secured in the groove as by a suitable adhesive. The remainder of the element extends outwardly from the periphery of the washer.

When the washer is stressed to the preselected level, the predetermined bias is overcome thereby effecting movement of the portion of the element extending beyond the bolt head. This provides a visual indication that the preselected stress level has been reached. It is presently contemplated that the resilient element will serve as a "monitor" of bolt tension and that it will return to its unstressed position as the bolt tension decreases.

Further features and advantages of the improved washer according to the present invention will become more fully apparent from the following detailed description and annexed drawings of the preferred embodiments thereof.

BRIEF DESCRIPTION OF THE DRAWINGS

In the drawings:

FIG. 1 is a view partly in section and partly in elevation showing a washer embodying the present invention in connection with a nut and bolt that are employed to connect two plates together;

FIG. 2 is a bottom plan view of the washer of FIG. 1 showing the position of the tab after the preselected tension has been achieved;

FIG. 3 is a sectional view of the washer of FIG. 2 but showing the position of the tab before the preselected tension has been achieved;

FIG. 4 is a view similar to FIG. 3 showing the position of the tab after the preselected tension has been achieved;

FIG. 5 is a bottom plan view of another form of washer embodying the present invention showing the tab in the stressed position;

FIG. 6 is a sectional view of the washer of FIG. 5, but showing the tab in the unstressed position;

FIG. 7 is a view similar to FIG. 6, but showing the tab in the stressed position;

FIG. 8 is a top plan view of a still further modification; and

FIG. 9 is a sectional view taken along the line 9—9 of FIG. 8.

DETAILED DESCRIPTION OF THE PREFERRED EMBODIMENTS

Referring now to the drawings in detail and particularly to FIGS. 1-4 thereof, a washer 10 which incorporates a tension indicating means 12 is shown in combination with a high tension bolt 14 and its cooperating nut 16 which serve to join two structural elements, shown here by way of illustation as two plates 18 and 20. The high tensile strength bolt 14 is of conventional design, shown by way of illustration as having a castellated hexagonal head 22 and a threaded shank 24 which between them define a bearing surface 26. The nut 16 is of similar hexagonal castellated configuration for the purposes of illustration and is shown to have approximately the same diameter as the bolt head 22. Thus, the annular bearing surface 28 defined by the nut 16 is substantially equal in area to the bearing surface 26. As is common, and as is preferred, the annular surface of the washer 10 is greater than the annular bearing surfaces 26 and 28. In general, the aperture 30 in the washer 10 is of about the same diameter as the aligned apertures 32 and 34 in the plates 18 and 20.

Save for the inclusion of the bolt tension indicating means 12 on the washer 10, the arrangement heretofore described and illustrated in FIG. 1 is wholly conventional and well known in the art. The materials from which the various components are made may be any suitable materials, although it is obvious to the skilled art worker that the major practical application for this invention lies in steel construction wherein the bolt, washer, nut and plates are all made of steel, the bolt and nut being made of a high tensile strength steel.

As indicated, the present invention resides in the incorporation in the washer 10 of a novel means for indicating the tension on the bolt 14. It will be clear from a perusal of FIG. 1 that as the tensile stress in the bolt 14 increases, the compressive stress on the washer 10 increases concomitantly. This being the case, if a tab 50 is joined to the balance of the washer by a section 52 of diminished thickness as by a slot 54 in the washer 10, the section 52 will be subjected to a downward force that will be dependent upon the tension in the bolt and not on torque or on any other parameter. Thus, by preselecting the thickness of section 52, washer 10 may be designed such that section 52 will fail at any preselected tension. When section 52 fails, tab 50 will move, such movement providing a visual indication that the preselected tension has been reached.

As presently preferred and best shown in FIG. 2, the slot 54 defines a chord of the washer 10. Assuming, as shown in FIG. 1, that the washer is intended for disposition between the bolt head 22 and the plate 18, it will be apparent that the required downward force on section 52 will be obtained only if the location of slot 54 is selected such that the bolt head overlies at least a portion of the secion 52. However, the bolt head should not fully cover the tab 50 so that movement of the tab will be clearly visible. Thus, assuming, as is preferred, that the tab 50 is initially in a deflected position (FIG. 3), as the bolt 14 is tightened, the downward force on the tab 50 will finally cause the tab 50 to flatten (FIG. 4) thereby giving a visual indication that a particular tension on the bolt has been reached. By proper selection of the dimensions of slot 54, the force required to flatten tab 50 may be predetermined with a high degree of accuracy whereby flattening of the tab will correspond to a specific tension on the bolt.

In FIG. 2, it will be noted that the thinned section 52 is defined both by the slot 54 and the lateral notches 56. Presently, this configuration is preferred. However, once this description is known, various other arrangements for defining a thinned portion will suggest themselves to those skilled in the art. For example, the transverse slot 54 could be eliminated and the thinned portion defined solely by the lateral notches 56. Alternatively, the notches 56 could be eliminated and the slot 54 retained. Suffice it to say it is desirable to select an arrangement which will result in maximum deflection for any given load. Considerations relevant to selecting such arrangements may be found, for example, in Peterson's Stress Concentration Design Factors.

While it is preferred that tab 50 start in the deflected position, this is not mandatory and the tab 50 could also start in the flattened position with deflection indicating that the predetermined bolt tension has been reached. If this modification is employed, it will be apparent that the bolt head 22 must terminate substantially at the slot 54 in order that tighetning of the bolt 14 will result in upward flexing of tab 50. Desirably, the bolt head should extend as close to the slot 54 as possible inasmuch as it has been found that the washer will not distribute much loading past the point of concentrated load.

Still another possibility is to use the embodiments of FIGS. 2-4 with the slot 54 confronting the bearing surface of the bolt head 22. If this variation is employed it will again be apparent that in order to accommodate upward flexing of tab 50, bolt head 22 should not overlie slot 54. However, to insure sufficient compressive loading in the region 52, bolt head 22 should extend as close as possible to the slot.

Of these three variations of the embodiment of FIGS. 2-4, the first is preferred inasmuch as it results in the greatest movement of tab 50 for any given compressive force and thus provides the most readily visible indication that the predetermined bolt tension has been reached.

The nature of the material of the tab 50 may be any suitable material, preferably brightly colored for easy visibility and possibly colored coded as to stress. In the embodiments of FIGS. 2-4, the tab 50 is preferably formed integrally with the washer 10 and thus formed of the same material as the washer. While a single tab 50 is shown, it will also be apparent that several such tabs may be incorporated in a single washer, with the possibility that each will indicate a different predetermined bolt tension. Furthermore, while the washer 10 is shown bearing against the bolt head 22, it will be apparent from the teachings herein that it may be employed equally effectively in bearing relation with the nut 16 as well. Thus, in all previous and subsequent description, this alternative use will be recognized as existing and practicable, as will the alternative of incorporating visual indicating means 12 in an integral nut and washer assembly.

Referring now to FIGS. 5-7, a modified washer 10 similar to that of FIGS. 2-4 is shown. The washer 10 of FIGS. 5-7 has a recess 60 and the tab 62 extends radially outward from the recess and is joined thereto by a portion of reduced cross section 64 defined by a slot 66 and lateral notches 68. In the washer 10 of FIGS. 5-7 the diameter of the washer is preferably selected such that the bolt head 22 overlies the thin portion 64 but does not fully cover the tab 62. The operation of the washer in FIGS. 5-7 is the same as that of FIGS. 2-4 with the tab 62 being shown in FIG. 6 in its initial, deflected position and in FIG. 7 in its final, flattened position, which it assumes when the predetermined tension on the bolt 14 has been reached. It will again be apparent that the flattening of the tab 62 will be readily visible to the worker applying tension to the bolt 14. Presently, the embodiment of FIGS. 5-7 is most preferred of all the embodiments described herein.

In the embodiment of FIGS. 5-7, it may be desirable to form the tab 62 separately from the balance of the washer 10. If so, the portion 64 may be joined to the balance of the washer by, for example, welding or a suitable adhesive. If this is done, the joint should be selected to withstand greater compressive loading than that required to move tab 62, lest the joint fails before the tab deflects.

It should be understood that the variations discussed above in connection with the embodiments of FIGS. 2-4 are equally applicable to the embodiments of FIGS. 5-7. Still another possibility equally applicable to both embodiments is heat treating the thin portion to effect fracturing rather than deflection. For example, washers are typically hardened as by case hardening or carburizing, in which the surface of the washer becomes inpregnated with carbon. If these processes are applied to the washer after the portion of reduced cross section is formed, the reduced portion will be almost completely carbon impregnated. As a result, the reduced portion will be quite brittle, subjecting it to fracture under sufficient load. By varying the degree of carbon impregnation, the load under which the reduced portion will fracture may likewise be varied whereby fracturing will provide a visual indication that a predetermined bolt tension has been reached.

Referring now to FIGS. 8 and 9, another embodiment of a washer 10 including visual indicating means 12 according to the present invention is shown. The washer of FIGS. 8-9 includes a radial slot or groove 70. Visual indicating means 12 comprises a strip of resilient material 72 which serves as a spring. The spring 72 is preferably at rest in the flattened position (solid lines in FIG. 9).

When the surface of the washer 10 including groove 70 and spring 72 is disposed in confronting relation with the bolt head and the bolt is then tightened, the spring 72 will be subjected to a force dependent on the tension of the bolt. When this force is sufficient, the spring 72 will deflect at its juncture with the bolt head 22 (dotted lines in FIG. 9) thereby giving a visual indication that a particular bolt tension has been reached. By preselecting the spring force, the force required to deflect the spring 72 may be predetermined with a high degree of accuracy whereby deflection of the spring will correspond to a specific bolt tension.

The embodiment of FIGS. 8-9 is intended to serve as a reusable "monitor" of bolt tension. That is, once the bolt is loosened, it is contemplated that the spring 72 will return to its initial flat position (solid lines in FIG. 9). Thus, the embodiment of FIGS. 8-9 provides a continuous indication as to whether or not the desired bolt tension is present.

The spring 72 may be comprised of any suitable resilient material. For example, metals and their alloys may be used and are preferred. However, the spring 72 may be comprised of suitably hard plastics as well. Desirably, the spring is not secured to the washer and is instead simply slipped into the groove 70 just before the bolt is tightened. This permits different springs having different spring forces to be used in connection with a single washer. Of course, if desired, the end of the spring 72 in the groove 70 could be secured therein as by a friction fit or a suitable adhesive.

Again, it will be appreciated that most of the modifications and changes suggested above in connection with FIGS. 1-7 are equally applicable to the embodiment of FIGS. 8-9.

As a further alternative for use in connection with the embodiment of FIGS. 8-9, the spring 72 may be replaced by a similarly dimensioned strip comprised, for example, of soft plastic. As the bolt head is tightened, the plastic strip will be subjected to a force dependent on the tension of the bolt. Depending upon the materials selected for the strip, the force applied to the strip by the bolt will eventually crush the strip substantially at its juncture with the bolt head 22. The result will be an upward deflection of the portion of the strip extending beyond the bolt head thereby giving a visual indication that a particular bolt tension has been achieved. The force required to crush the strip will, of course, depend upon the material from which the strip is made. By preselecting the material, the force required to deflect the strip may be predetermined with a high degree of accuracy whereby deflection will correspond to a specific bolt tension. Of course, when deflection is caused by crushing, the strip will not return to its initial or flat position upon loosening of the bolt. Accordingly, this modification is not suitable for use as a monitor of bolt tension.

Any one of the washers 10 described hereinbefore may be employed in association with a pneumatic or electric torque wrench and the indicating means 12 may be operatively connected to a suitable signal producing mechanism to provide a signal input for the wrench to stop when the means 12 indicates that the prescribed tension has been achieved. Clearly, a simple electric or pneumatic servo system can be employed in this manner once it is recognized that the washer 10 is available to the skilled art worker for such use.

When the various embodiments described hereinabove are used in connection with a socket-type wrench, it may be desirable to remove, as by milling, the portion of the upper surface of the visual indicating means 12 adjacent the bolt head 22 as this reduces the possibility of interference between the wrench and the indicating means.

Irrespective of the form of the invention employed herein, it will be apparent to anyone of ordinary skill that the incorporation of my stress indicating means in any of its forms will not render the washer (or nut or bolt) non-compliant with current codes and, thus, it will not be necessary to effect amendments to such codes to bring about commercialization of the invention hereinbefore described in all of its forms.

While I have herein shown and described the preferred form of the present invention and have suggested several modifications therein, other changes and modifications may be made therein within the scope of the appended claims without departing from the spirit and scope of this invention.

What is claimed is:

1. In a flat annular washer of the type suitable for use in cooperation with a nut or a bolt head having a given radius, the improvement which comprises means for indicating that the stress on said washer has reached a preselected level, said indicating means comprising an element joined to said washer by a portion of reduced cross section, at least a portion of said element extending a distance from the center of said washer not less than the radius of said nut or bolt head, said portion of reduced cross section having a predetermined stress failure which is reached when said washer achieves said preselected stress level, whereby when said washer is stressed to said preselected level, said portion of reduced cross section fails thereby effecting movement of said element relative to said washer.

2. The washer of claim 1, wherein said element is a tab.

3. The washer of claim 2, wherein said tab is defined by a slot in a surface of said washer along a chord thereof.

4. The washer of claim 2, wherein said washer has a peripheral recess, and wherein said tab is disposed in said recess and integrally joined to said washer at the radially inward end of said recess by said portion of reduced cross section.

5. The washer of claim 3 or 4, wherein said tab is angled with respect to said washer toward said nut or bolt head, said nut or bolt head overlies at least part of said portion of reduced cross section, and said tab moves into substantially coplanar relation with said washer when said portion of reduced cross section fails.

6. The washer of claim 3 or 4, wherein said tab is coplanar with respect to said washer, said nut or bolt head terminates substantially at said portion of reduced cross section, and said tab moves out of coplanar relation with said washer when said portion of reduced cross section fails.

7. The washer of claim 2, wherein said tab separates from said washer along said portion of reduced cross section when said washer is stressed to said preselected level.

* * * * *